United States Patent
Balin et al.

(10) Patent No.: US 12,158,835 B1
(45) Date of Patent: Dec. 3, 2024

(54) COMPUTING SYSTEMS AND METHODS GENERATING AND VALIDATING LOG RECORDS

(71) Applicant: Dell Products, L.P., Round Rock, TX (US)

(72) Inventors: Maxim Balin, Gan-Yavne (IL); Roman Bober, Ashdod (IL); Doron Bokobza, Beer Sheva (IL)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/469,142

(22) Filed: Sep. 18, 2023

(51) Int. Cl.
| | |
|---|---|
| *G06F 15/16* | (2006.01) |
| *G06F 11/34* | (2006.01) |
| *G06F 15/173* | (2006.01) |
| *G06F 21/60* | (2013.01) |
| *G06F 21/64* | (2013.01) |

(52) U.S. Cl.
CPC ........ *G06F 11/3476* (2013.01); *G06F 21/602* (2013.01); *G06F 21/64* (2013.01)

(58) Field of Classification Search
CPC ..... G06F 11/3476; G06F 21/602; G06F 21/64

USPC ........................................................ 709/224
See application file for complete search history.

(56) References Cited

U.S. PATENT DOCUMENTS

| | | | |
|---|---|---|---|
| 6,453,416 B1* | 9/2002 | Epstein | G06F 21/64 |
| | | | 713/170 |
| 10,757,103 B2* | 8/2020 | Irwan | H04W 12/068 |
| 2002/0065912 A1* | 5/2002 | Catchpole | H04L 9/40 |
| | | | 713/168 |
| 2014/0136840 A1* | 5/2014 | Spalka | G06F 21/34 |
| | | | 713/165 |
| 2020/0183913 A1* | 6/2020 | Murphy | G06F 11/302 |
| 2020/0272619 A1* | 8/2020 | Alferov | H04L 9/3297 |
| 2023/0111194 A1 | 4/2023 | Shachar et al. | |

* cited by examiner

*Primary Examiner* — Ruolei Zong
(74) *Attorney, Agent, or Firm* — Fogarty LLP (57) ABSTRACT

Systems and methods support generation and validation of log records. For instance, a software object may generate log records and save those log records to a first repository. Either the same or a different software object may then generate a hash for each log record and then encrypt each hash and store each hash in another repository. A software object that consumes the log records may then validate a given log record by accessing its corresponding encrypted hash, decrypting the hash, and comparing the decrypted hash to a re-generated hash of the particular log record.

20 Claims, 5 Drawing Sheets

COMPUTING SYSTEMS AND METHODS GENERATING AND VALIDATING LOG RECORDS

FIELD

The present disclosure relates to computing security and more particularly to tools for generating and validating log records in a computing system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Further, as the value and use of information continues to increase, so does the value of security. There is a need in the art for effective and efficient techniques for providing computing security.

SUMMARY

In various embodiments, a method includes: during runtime of an application, generating a first log record by a first software component in response to an event associated with the first software component, wherein the application includes a plurality of software components; generating a first hash of the first log record; encrypting the first hash according to a private key of the first software component, thereby generating an encrypted hash; and storing the encrypted hash.

In some embodiments, an IHS (Information Handling System) is configured to support software log validation, and the IHS includes: one or more processors; one or more memory devices coupled to the one or more processors, the one or more memory devices storing computer-readable instructions that, upon execution by the one or more processors, cause the IHS to: store a first encrypted hash in a first repository, wherein the first encrypted hash is generated from a first log record, wherein the first log record refers to a first software component; access the first encrypted hash from the first repository; generate a first hash, including decrypting the first encrypted hash according to a public key of the first software component; analyze the first hash against a second hash of the first log record; and either validate or not validate the first log record in response to analyzing the first hash against the second hash.

In some embodiments, a non-transitory computer-readable storage device has instructions stored thereon for software log validation on an IHS (Information Handling System), and execution of the instructions by one or more processors of the IHS causes the one or more processors to: access a first encrypted hash from a first repository, wherein the first encrypted hash is generated from a first log record, and wherein the first log record refers to a first software component; generate a first hash, including decrypting the first encrypted hash according to a public key of the first software component; analyze the first hash against a second hash of the first log record; and either validate or not validate the first log record in response to analyzing the first hash against the second hash.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

In the rapidly evolving field of edge computing, software development for edge systems faces numerous challenges that can negatively impact the reliability and security of the final product. These challenges include the desire for secure and efficient object management, a desire for a robust root of trust, and reliable component verification and traceability. The present disclosure addresses these challenges through a process for validating log records for computing systems generally as well as in edge systems in particular.

Software object log records (also called log records or audit logs) may provide a record of activities and changes made to software objects. Such information may be valuable in detecting and investigating any potential security breaches or incidents, as well as in monitoring and improving the performance and reliability of software systems. Log records may be used to track changes made to software objects, identify who made the changes and when, and determine the impact of these changes on the system.

Additionally, log records may be used for auditing purposes, such as ensuring compliance with regulations and standards and for performance analysis to identify potential bottlenecks and areas for improvement. Log records may help organizations maintain the integrity and security of their systems and make informed decisions about future updates and changes by keeping a record of software object activities and changes.

One particular challenge with current solutions is proving that a given log record was created by a particular system and belongs to the particular system as well as proving that the log record was not tampered with or maliciously manipulated. Various embodiments herein provide techniques to validate log records, thereby allowing a user to prove the origin of a given log record as well as to ensure that the log record was not tampered with or otherwise changed.

In one example, when a new log record is created by a first software component, the software component may also create a hash of the log record and then encrypt the hash. For instance, the first software component may use its private key to encrypt the hash. The software component or a different component may then store the encrypted hash in a repository.

Continuing with the example, there may come a point where it is desired to consume the log record. For instance, a second software component may be tasked with reviewing log records. The second software component may access the log record itself from a software log repository and may also access the encrypted hash from an encrypted hash repository. The second software component may then decrypt the encrypted hash using a public key of the first software component. The second software component may also re-generate the hash by, e.g., applying the hashing algorithm to the original log record again. The second software component may compare the decrypted hash to the re-generated hash, where a match between the two hashes indicates that the log record is unchanged. However, a mismatch may indicate that the log record has been changed.

Various embodiments may provide advantages over prior solutions. For instance, some implementations may add security to a computer system by making the log records unequivocally attributable to a particular software component, e.g., by using that software component's private key for encryption of the hash. Furthermore, such implementation may also prevent changes to the log record, at least without using the private key of the software component. Added together, such features may provide log records that allow for a more confident audit by decreasing the chance of malicious manipulation and by providing an automated way for another software component to verify the origination and content.

Figure 1:
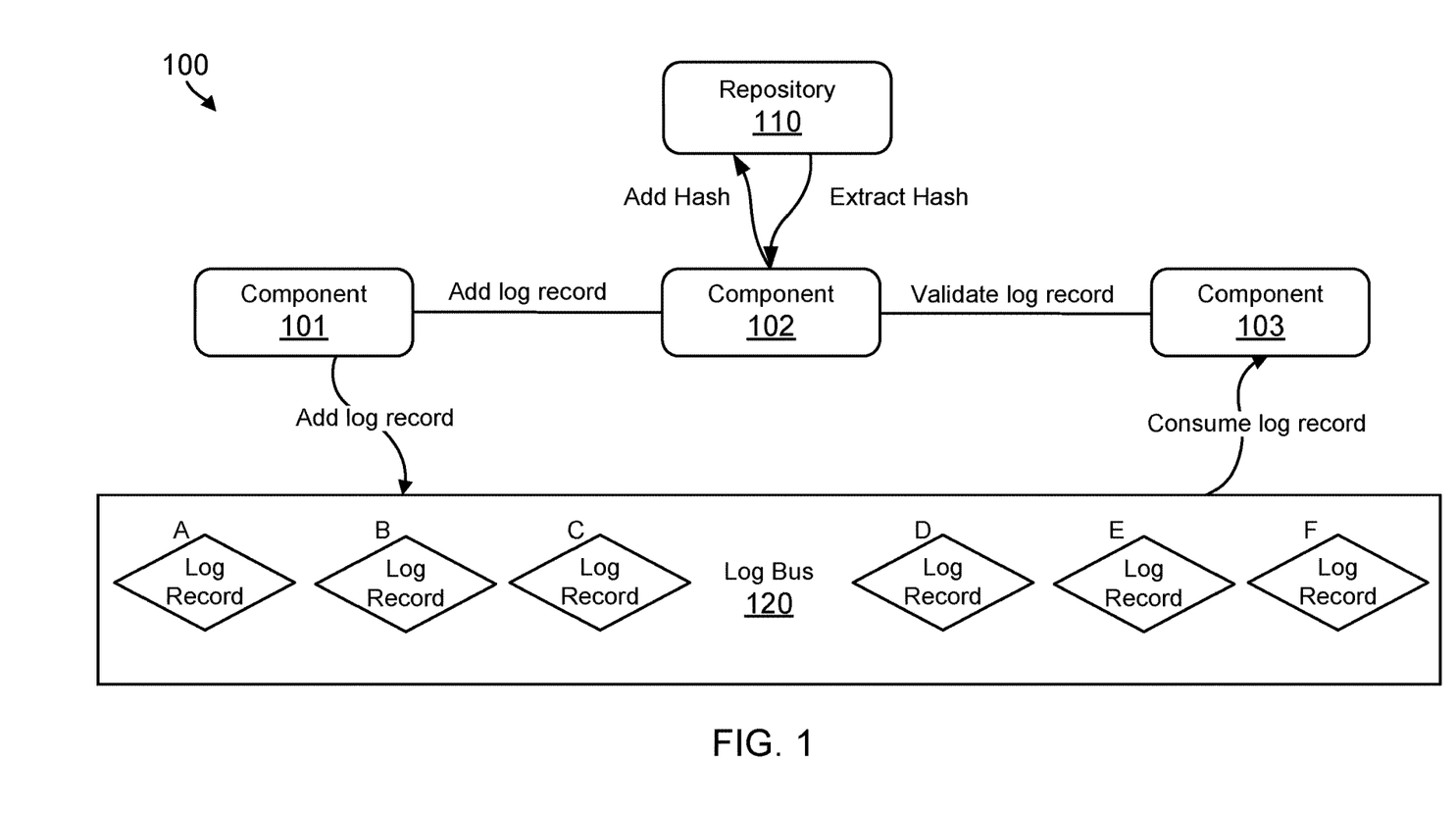
FIG. 1 is an illustration of an example runtime environment, including multiple software components, according to one embodiment.

FIG. 1 is an illustration of an example runtime environment 100, supporting log record validation, according to some embodiments. Environment 100 includes software component 101, software component 102, and software component 103. The scope of implementations is not limited to any particular type of software component, and examples of software components that may be adapted for use in some embodiments include objects, models, packages, microservices, containers, and the like.

The interaction between software components 101, 102, 103 within the environment 100 drives the functionality and behavior of the system. These interactions may be facilitated through a set of rules, protocols, and structures that collectively form the architecture of the application in the environment 100. One aspect of this interaction is the utilization of Application Programming Interfaces (APIs), which serve as the bridges connecting various software components, enabling the software components 101, 102, 103 to collaborate and communicate.

API calls are how software components 101, 102, 103 request services or exchange data with each other. These calls involve invoking specific functions or methods exposed by the API. These calls adhere to a defined protocol, ensuring that the data exchanged is accurate and consistent. A given API call may originate from one of the software components 101, 102, 103 to a different one of the software components or may originate from external to the application itself. Once received by a particular software component, the call may cause the software component to perform an action.

APIs may be associated with endpoints, which represent specific uniform resource locators (URLs) or paths that correspond to distinct functionalities or resources within an application. Each endpoint corresponds to a set of API calls that may perform various operations. In an edge computing monitoring application, the different endpoints may handle authentication, remote access control, system reset, performance reporting, and other sensitive items.

Computer systems that handle or process sensitive data may benefit from increased security. In an example of an edge computing system, as noted above, software components may access endpoints to handle authentication, remote access control and the like. Therefore, log records may be used to help in a variety of ways, such as for root cause analysis, security breach analysis, and the like.

The software components 101, 102, 103 may each be configured to generate log records in response to events. An event may include, e.g., accessing a sensitive endpoint, setting up a new user, accessing particular databases, a failed login attempt, and the like. Furthermore, a given log record may include information such as a timestamp, identification of software component, identification of user, operation performed, endpoint accessed, and the like. The scope of implementations is not limited to any particular event nor any particular content of a log record.

During runtime, the software components 101, 102, 103 are instantiated. Using component 101 as an example, as it performs various actions, it may generate log records and store those log records to the log bus 120. Log bus 120 in this example includes a multitude of discrete log records A-F, where each of those log records is generated for a particular event and for a particular one of the components 101, 102, 103. Log bus 120 may use memory space allocated in non-volatile memory and may be kept for as long as is appropriate.

As an illustrative example, software component 101 may be executing and may generate log record A in response to encountering an event. Component 101 saves log record A to the log bus 120. Component 101 may also generate a hash of the log record A using any appropriate hashing algorithm. One example hashing algorithm includes message digest method 5 (MD5), though the scope of embodiments is not limited to any particular hashing algorithm. In one example, the resulting hash is a text string that is substantially shorter than the log record from which it is generated.

Software component 101 may then encrypt the hash using any appropriate algorithm. Continuing with the example, software component 101 may encrypt the hash using public key/private key encryption, where software component 101 performs encryption using its private key. Software component 101 may then pass the encrypted hash to component 102, which then stores the encrypted hash in repository 110.

In this example, the repository 110 stores encrypted hashes, and it is separate from the log bus 120, which stores log records. As a result, in some examples, the repository 110 may be substantially smaller (in bytes) than is log bus 120. Furthermore, the repository 110 may be implemented within nonvolatile memory. One example of repository 110 is a database, which stores encrypted hashes and which allows the hashes to be searched by hash ID, log record ID, software component ID, user ID, or the like.

Of note at this point in the example is that the encrypted hash is attributable to component 101 by virtue of its being encrypted using the private key of component 101. Further, one of the other software components 102, 103 may access the encrypted hash and decrypt the encrypted hash using the public key associated with component 101.

Further in this example, the software component 103 may be dedicated to consuming log records, such as by accessing log records and providing those log records to a requesting other component. Software component 103 may access, e.g., log record A and then send a validation request to software component 102, e.g., via API. In response to the request, software component 102 may then search the repository 110 according to any appropriate key, access the encrypted hash corresponding to the log record A, and decrypt the encrypted hash. An example of decrypting the encrypted hash includes using the public key of software component 101 to perform a decryption operation. The result of decrypting is to return another text string.

Software component 102 may then analyze the resulting text string to determine whether the log record A is valid. For instance, if the text string that results from the decrypting operation matches a hash of the log record A, then that is an indication that the log record A has not been changed. Software component 102 may perform the analysis and report the results of the analysis to component 103, e.g., via API. For instance, component 102 may report "valid" if there is a match and may report "invalid" if there is not a match. Component 103 may then act appropriately by, e.g., moving forward in the case of validation or perhaps performing an exception operation in the case of the log record being invalid.

Of course, the scope of implementations does not require that any particular one of the components 101, 102, 103 performs the actions exactly as described above. Rather, some embodiments may include component 101 storing the encrypted hash to the repository 110 and component 103 accessing the encrypted hash, performing decrypting and validation. In other words, some or all of the actions described with respect to component 102 may be implemented within component 101 or component 103 instead.

Figure 2:
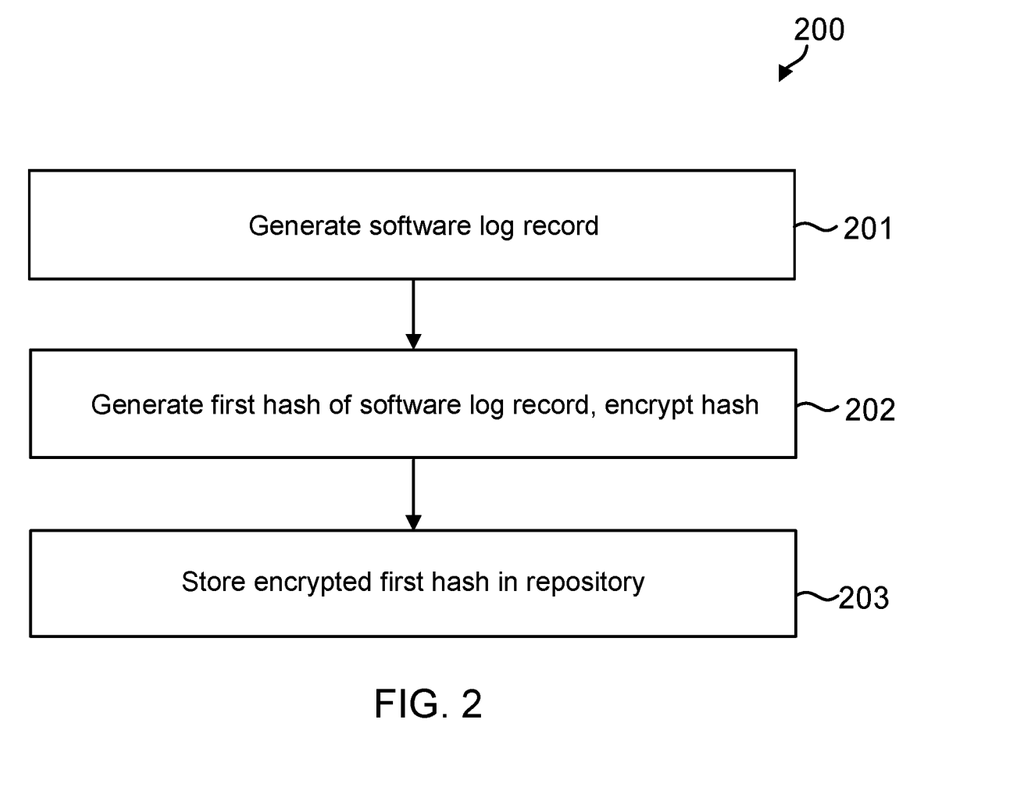
FIG. 2 is a flowchart describing certain steps of a method, according to embodiments, for log record generation.

FIG. 2 is an illustration of an example method 200 for generating log records, according to one embodiment. The actions of method 200 may be performed by a computing device as it executes computer-readable instructions to provide the functionality of a software component or application. For example, a computing device executing computer-readable instructions to provide the functionality of any one of software components 101, 102, 103 may perform the actions of method 200.

At action 201, the software component generates a log record. A software component, such as a software object or container, is configured to play a role in maintaining system transparency and accountability through the generation of log records in response to events. When an event occurs, such as a user login attempt or a critical system operation, the software component may capture pertinent information related to that event. Such information may include details like the event type, timestamp, user or system identifier, and any relevant parameters or context data. Subsequently, the software component may append this information to an audit log, which serves as a chronological record of the system activities. An example of an audit log includes the log bus 120. These log records not only aid in troubleshooting and debugging but may also provide a tool for security analysis, compliance monitoring, and ensuring the system's integrity and adherence to established policies and regulations.

At action 202, the software component generates a first hash of the log record. For instance, the log record may include multiple kilobytes of data, and a hashing algorithm may be used to generate a text string of 50 to 100 characters based on the log record. In some examples, the hashing algorithm is deterministic so that the same input would be expected to generate the same output hash. Of course, any appropriate hashing algorithm may be used at action 102.

Further at action 202, the software component may encrypt the first hash. For instance, the software component may have a private/public key pair associated with an encryption certificate. Other software components may have access to the certificate, including the public key. The software component itself may use its private key to encrypt the hash, thereby generating an encrypted hash of the log record.

At action 203, the software component may store the encrypted first hash in a repository. For instance, in the example of FIG. 1, repository 110 stores the encrypted first hash, and repository 110 is separate from the log bus 120. Furthermore, the software component itself may store the encrypted first hash in the repository, or the software component may pass the encrypted first hash to another component to perform the storing.

As a result of method 200, the system has a log record stored at a first repository, such as log bus 120, and has an encrypted hash of the log record stored in another repository, such as repository 110. The encrypted hash of the log record may be attributable to the particular software component by virtue of being encrypted by the private key of the software component, as well as by other techniques, such as having unencrypted metadata that identifies the particular software component.

Figure 3:
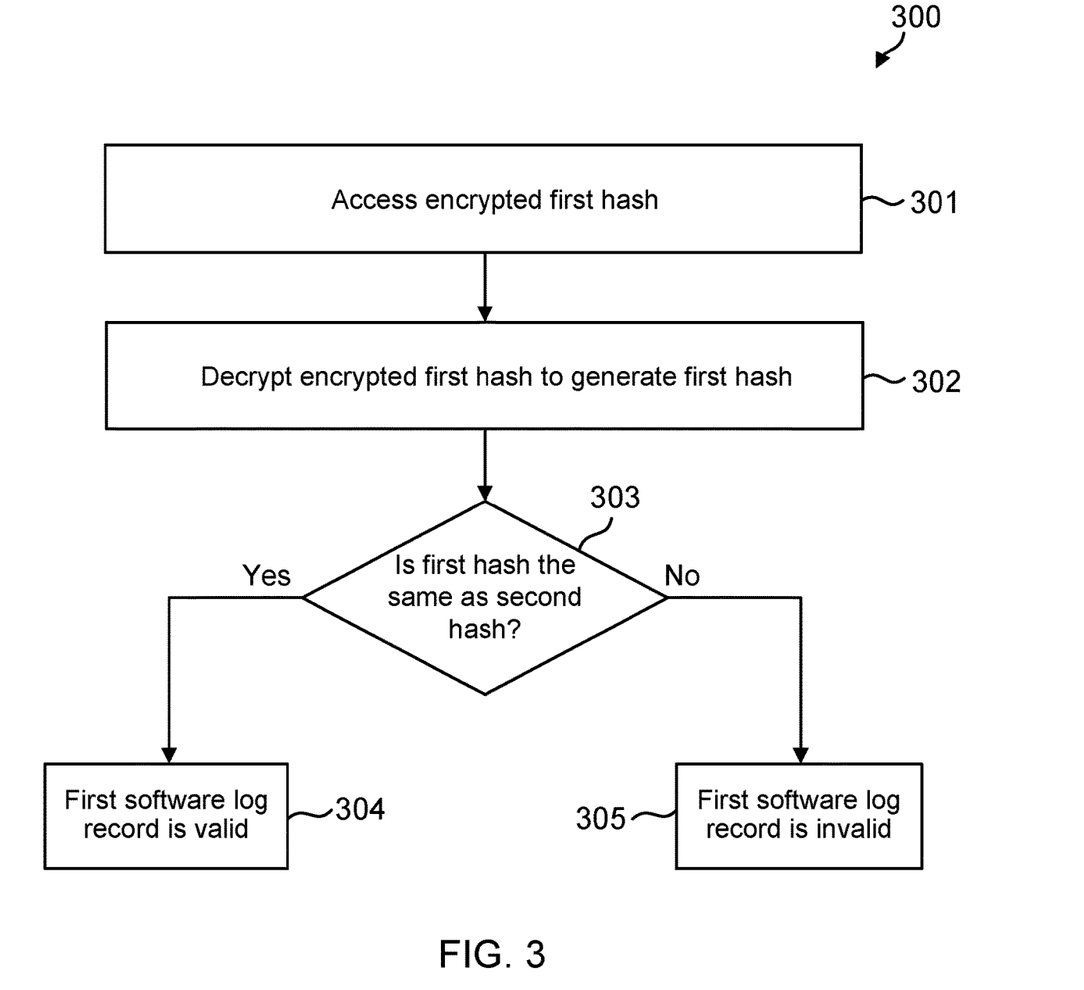
FIG. 3 is a flowchart describing certain steps of a method, according to embodiments, for log record validation.

FIG. 3 is an illustration of an example method 300 for validating log records, according to one embodiment. The actions of method 300 may be performed by a computing device as it executes computer-readable instructions to provide the functionality of a software component or application. For example, a computing device executing computer-readable instructions to provide the functionality of any one of software components 101, 102, 103 may perform the actions of method 300.

In this example, method 300 is performed subsequently to method 200, so that the log record and the encrypted hash are both stored. Method 300 may be performed by a software component that is the same as, or different from, the software components that perform the actions of method 200. For instance, in one example, software components 101 and 102 may have coordinated to perform method 200, whereas components 102 and 103 may coordinate to perform method 300.

At action 301, a software component accesses the encrypted first hash. For instance, the software component (e.g., software component 103) may be tasked with retrieving validated log records, and another software component (e.g., software component 102) may be tasked with performing the validation operation. Continuing with the example, the software component 102 may retrieve the encrypted first hash from repository 110 based on a request from software component 103.

At action 302, the software component 102 may decrypt the encrypted first hash. The decrypting operation may be performed using the public key associated with the private key that performed the encryption.

At action 303, the software component 102 may determine whether the first log record is valid. Specifically, the decrypting operation of action 302 generated a first hash. The software component 102 may generate a second hash from the log record. Specifically, the software component 102 may access the log record from the corresponding repository and re-generate the hash using the same hashing algorithm. The software component 102 may then compare the first hash (decrypted from the encrypted first hash) to the second hash (re-generated from the log record). A match may indicate that the log record is valid (action 304), whereas a mismatch may indicate that the log record is invalid or, at least, has been changed after the encrypted first hash was stored (action 305).

The software component 102 may then provide the results to a requesting component, such as software component 103. Assuming that the validating operation indicates a valid log record, then an audit operation may continue. However, if the validating operation indicates an invalid log record, then an audit operation may perform any appropriate action, such as performing an exception operation, alerting an administrator, or the like.

The scope of implementations is not limited to the specific series of actions shown in FIGS. 2-3 rather, some implementations may add, omit, rearrange, or modify ones of the actions. As an example, during normal operation, method 200 may be performed for some or all events and for some or all software components. Furthermore, an audit operation may include performing method 300 for multiple log records.

Figure 4:
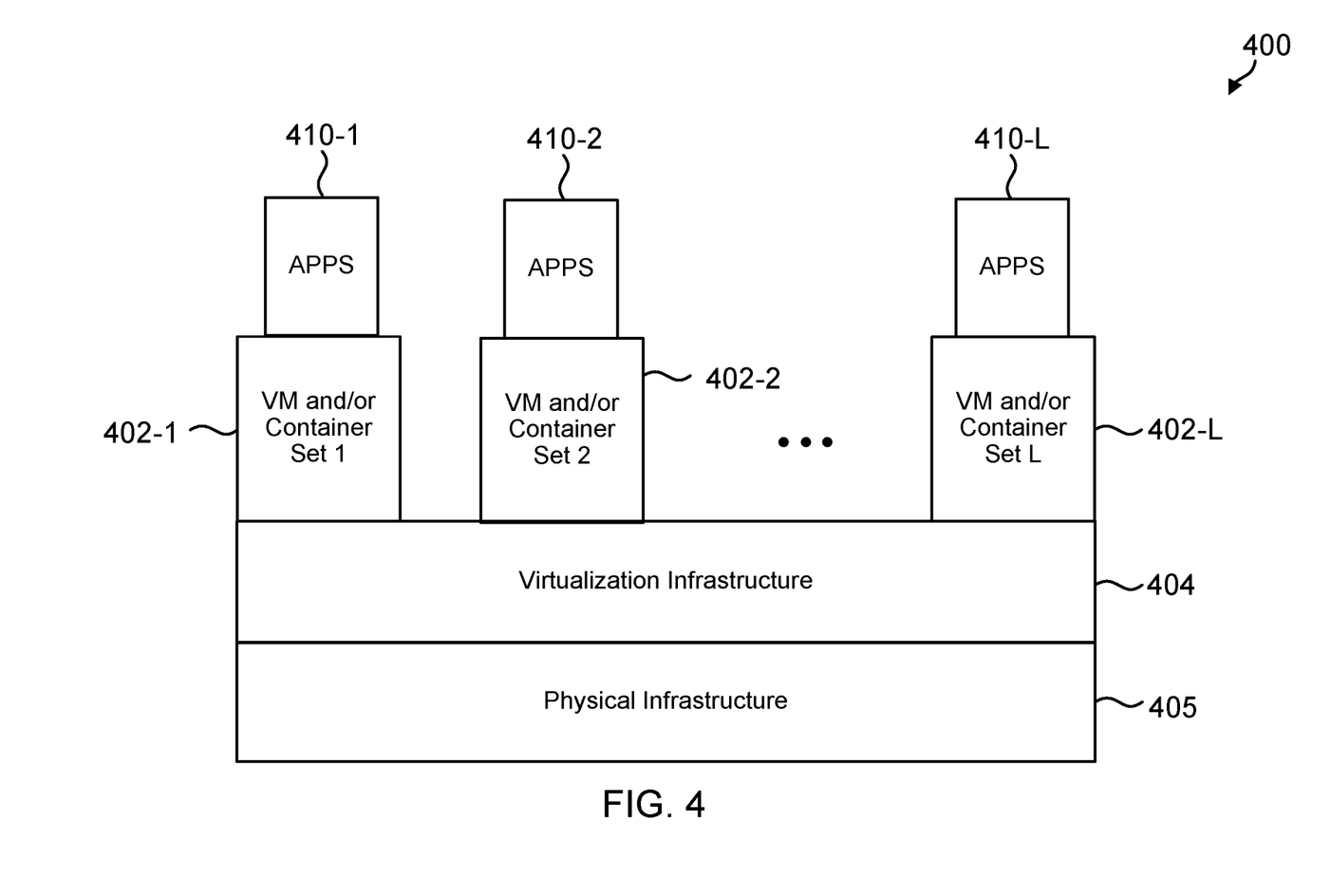
FIG. 4 is an illustration of an example processing platform that may be utilized in some embodiments.
Figure 5:
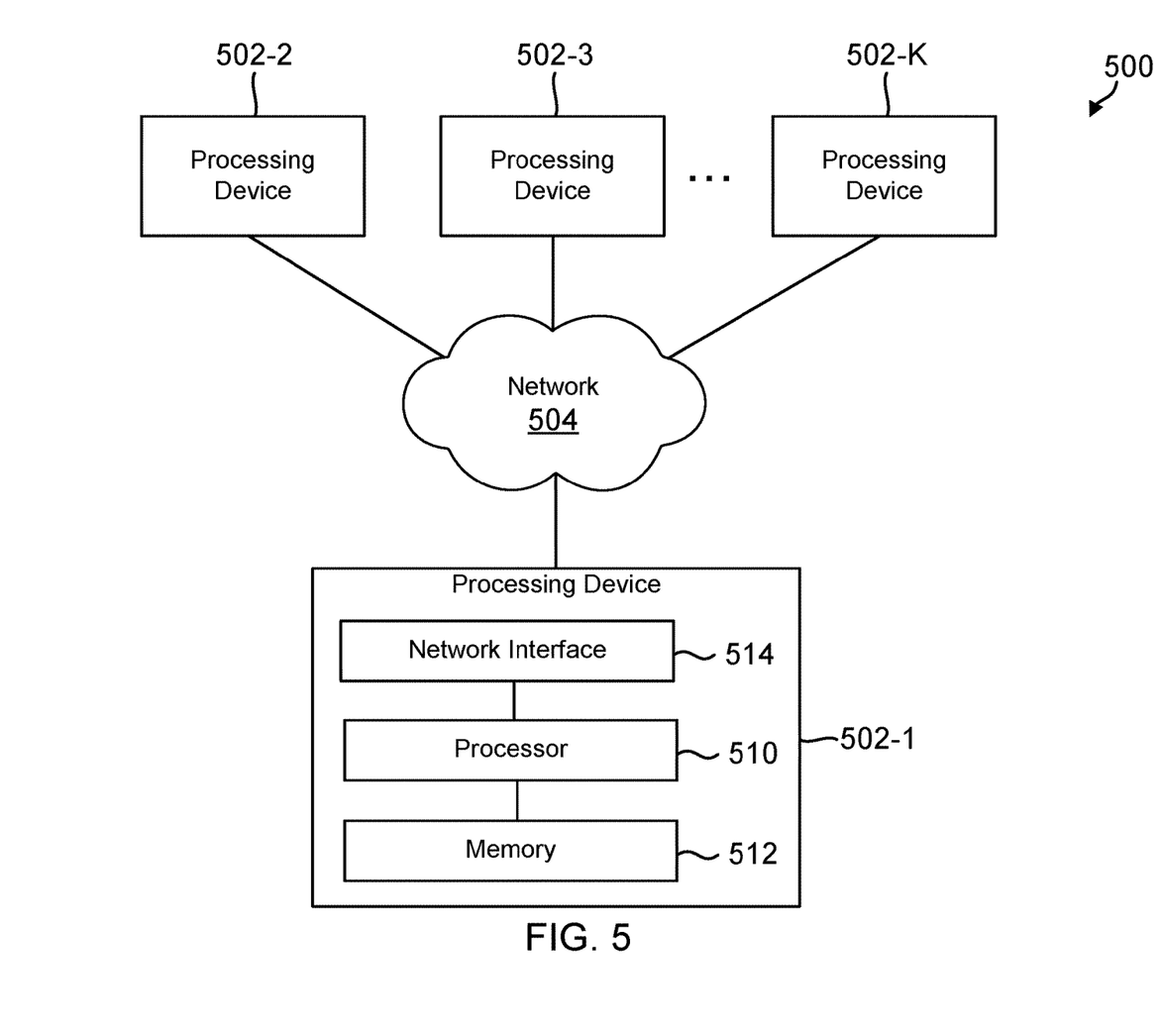
FIG. 5 is an illustration of an example processing platform that may be utilized in some embodiments.

Illustrative embodiments of processing platforms will now be described in greater detail with reference to FIGS. 4 and 5. For instance, FIGS. 4 and 5 illustrate example processing platforms on which an application, such as the application associated with runtime environment 100 of FIG. 1, may be run. For instance, an application or multiple applications, associated with any one or all of software components 101-103, may be run on the processing platforms illustrated in FIGS. 4 and 5.

FIG. 4 shows an example processing platform including cloud infrastructure 400. The cloud infrastructure 400 includes a combination of physical and virtual processing resources that are utilized to implement at least a portion of the information processing system 100. The cloud infrastructure 400 may include multiple virtual machines (VMs) and/or container sets 402-1, 402-2, . . . 402-L implemented using virtualization infrastructure 404. The virtualization infrastructure 404 runs on physical infrastructure 405 and may include one or more hypervisors and/or operating system-level virtualization infrastructure. The operating system-level virtualization infrastructure may include kernel control groups of a Linux operating system or other type of operating system.

The cloud infrastructure 400 further may include sets of applications 410-1, 410-2, . . . 410-L running on respective ones of the VMs/container sets 402-1, 402-2, . . . 402-L under the control of the virtualization infrastructure 404. In one example, a given one of the applications 410 may correspond to an application in application layer 200 of FIG. 2, where such application may include components 201-203. However, the scope of embodiments includes an application layer that is in a virtualization infrastructure or otherwise. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that may include at least one hypervisor.

A hypervisor platform may be used to implement a hypervisor within the virtualization infrastructure 404, where the hypervisor platform has an associated virtual infrastructure management system. The underlying physical machines may include one or more distributed processing platforms that include one or more storage systems.

In other implementations of the FIG. 4 embodiment, the VMs/container sets 402 include respective containers implemented using virtualization infrastructure 404 that provides operating system level virtualization functionality, such as support for containers running on bare metal hosts, or containers running on VMs. The containers may be implemented using respective kernel control groups of the operating system.

One or more of the processing modules or other components of an information processing system may each run on a computer, server, storage device or other processing platform element. A given such element is viewed as an example of a computing device. The cloud infrastructure 400 shown in FIG. 4 may represent at least a portion of one processing platform. Another example of such a processing platform is processing platform 500 shown in FIG. 5.

The processing platform 500 in this embodiment may include a portion of the information processing system 100 and includes a plurality of processing devices, denoted 502-1, 502-2, 502-3 . . . 502-K, which communicate with one another over a network 504.

The network 504 may include any type of network, including by way of example a global computer network such as the Internet, a WAN, a LAN, a satellite network, a telephone or cable network, a cellular network, a wireless network such as a Wi-Fi or 5G network, or various portions or combinations of these and other types of networks.

The processing device 502-1 in the processing platform 500 may include a processor 510 coupled to a memory 512. The processor 510 may include a microprocessor, a microcontroller, an application-specific integrated circuit (ASIC), a field-programmable gate array (FPGA) or other type of processing circuitry, as well as portions or combinations of such circuitry elements.

The memory 512 may include random access memory (RAM), read-only memory (ROM) or other types of memory, in any combination. The memory 512 and other memories disclosed herein should be viewed as illustrative examples of processor-readable storage media or computer-readable media storing executable program code (e.g., computer-readable instructions) of one or more software programs.

Articles of manufacture including such processor-readable storage media are considered illustrative embodiments. A given such article of manufacture may include, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products including processor-readable storage media can be used.

Also included in the processing device 502-1 is network interface circuitry 514, which is used to interface the processing device with the network 504 and other system components and may include conventional transceivers.

The other processing devices 502 of the processing platform 500 are assumed to be configured in a manner similar to that shown for processing device 502-1. Each of the processing devices 502 is an example of an information handling system (IHS). Information handling systems may include any of a variety of devices, such as servers, personal computers, smart phones, and the like. Any of the processing devices 502 may be configured to execute computer-readable instructions to perform actions associated with FIGS. 2-3.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   during runtime of an application, generating a first log record by a first software component in response to a change made to the first software component, wherein the application includes a plurality of software components, wherein the log record includes an identification of the first software component;
   generating a first hash of the first log record;
   encrypting the first hash according to a private key of the first software component, thereby generating an encrypted hash;
   transmitting the encrypted hash to a second software component, which is different from the first software component; and
   storing the encrypted hash in an encrypted hash repository by the second software component, wherein the encrypted hash is searchable within the encrypted hash repository by the identification of the first software component.

2. The method of claim 1, further comprising:
   storing the first log record in a log record repository with a plurality of other log records, wherein the log record repository is separate from the encrypted hash repository.

3. The method of claim 1, further comprising:
   accessing the first log record from a log record repository subsequent to the encrypted hash being stored in the encrypted hash repository.

4. The method of claim 3, further comprising:
   accessing the encrypted hash from the encrypted hash repository, including searching by the identification of the first software component; and
   decrypting the encrypted hash according to a public key of the first software component.

5. The method of claim 4, further comprising:
   performing a hashing algorithm on the first log record to generate a second hash of the first log record;
   analyzing the first hash and the second hash; and
   either validating or not validating the first log record based on a result of analyzing the first hash and the second hash.

6. The method of claim 4, further comprising:
   performing a hashing algorithm on the first log record to generate a second hash of the first log record;
   analyzing the first hash and the second hash; and
   validating the first log record based on a result of analyzing the first hash and the second hash indicating a match between the first hash and the second hash.

7. The method of claim 4, further comprising:
   performing a hashing algorithm on the first log record to generate a second hash of the first log record;
   analyzing the first hash and the second hash; and
   not validating the first log record based on a result of analyzing the first hash and the second hash indicating a mismatch between the first hash and the second hash.

8. The method of claim 1, wherein the second software component is separate from a third software component, which is dedicated to consuming log records from a log record repository.

9. An IHS (Information Handling System) configured to support software log validation, the IHS comprising:
   one or more processors;
   one or more memory devices coupled to the one or more processors, the one or more memory devices storing computer-readable instructions that, upon execution by the one or more processors, cause the IHS to:
   receive a first encrypted hash from a first software component;
   store the first encrypted hash in a first repository, wherein the first encrypted hash is generated from a first log record that records a change made to the first software component, wherein the first log record includes an identification of the first software component;
   access the first encrypted hash from the first repository, including searching the first repository by the identification of the first software component, wherein the first encrypted hash is accessed by a second software component, which is different from the first software component;
   generate a first hash, including decrypting the first encrypted hash according to a public key of the first software component;
   analyze the first hash against a second hash of the first log record; and
   either validate or not validate the first log record in response to analyzing the first hash against the second hash.

10. The IHS of claim 9, further comprising computer-readable instructions to cause the IHS to:
   receive a request from a third software component, which is different from the first software component and the second software component, to validate the first log record.

11. The IHS of claim 9, further comprising computer-readable instructions to cause the IHS to:
   generate the first encrypted hash using a private key of the first software component.

12. The IHS of claim 9, wherein the computer-readable instructions to cause the IHS to either validate or not validate the first log record comprises computer-readable instructions to cause the IHS to:
   validate the first log record in response to determining that the first hash matches the second hash.

13. The IHS of claim 9, wherein the computer-readable instructions to cause the IHS to either validate or not validate the first log record comprises computer-readable instructions to cause the IHS to:
   not validate the first log record in response to determining that the first hash does not match the second hash.

14. The IHS of claim 9, further comprising computer-readable instructions to cause the IHS to:
   store the first log record in a log record repository, wherein the log record repository is different from the first repository.

15. A non-transitory computer-readable storage device having instructions stored thereon for software log validation on an IHS (Information Handling System), wherein execution of the instructions by one or more processors of the IHS causes the one or more processors to:
   receive a first encrypted hash from a first software component by a second software component and store the first encrypted hash to a first repository, wherein the first software component is different from the second software component;
   access the first encrypted hash from the first repository, wherein the first encrypted hash is generated from a first log record, and wherein the first log record includes an identification of the first software component and records a change made to the first software component, further wherein accessing the first encrypted hash includes searching the first repository by the identification of the first software component;
   generate a first hash, including decrypting the first encrypted hash according to a public key of the first software component;
   analyze the first hash against a second hash of the first log record; and
   either validate or not validate the first log record in response to analyzing the first hash against the second hash.

16. The non-transitory computer-readable storage device of claim 15, wherein the instructions to cause the one or more processors to decrypt the first encrypted hash further includes instructions to cause the one or more processors to either validate or not validate the first log record based at least in part on receiving a request from a third software component that is different from the first software component and the second software component.

17. The non-transitory computer-readable storage device of claim 15, wherein the instructions to cause the one or more processors to either validate or not validate the first log record are included in an auditing application.

18. The non-transitory computer-readable storage device of claim 15, wherein the instructions to cause the one or more processors to either validate or not validate the first log record comprises instructions to cause the one or more processors to:
   validate the first log record in response to determining that the first hash matches the second hash.

19. The non-transitory computer-readable storage device of claim 15, wherein the instructions to cause the one or more processors to either validate or not validate the first log record comprises instructions to cause the one or more processors to:
   not validate the first log record in response to determining that the first hash does not match the second hash.

20. The non-transitory computer-readable storage device of claim 19, further comprising instructions to cause the one or more processors to:
   perform an exception operation in response to the first log record not being validated.

* * * * *